DEVICE FOR GENERATING RANGE MARKS

Filed Sept. 14, 1956 2 Sheets-Sheet 1

INVENTORS
WILLIAM T. POPE
ALBERT J FEINER
BY Wade Koontz
ATTORNEY and
Richard J Killoran
AGENT

DEVICE FOR GENERATING RANGE MARKS

Filed Sept. 14, 1956 2 Sheets-Sheet 2

INVENTORS
WILLIAM T. POPE
ALBERT JFEINER
BY Wade Koontz
ATTORNEY
and
Richard J Killoren
AGENT

United States Patent Office 2,892,942

Patented June 30, 1959

2,892,942

DEVICE FOR GENERATING RANGE MARKS

William T. Pope and Albert Feiner, Rome, N.Y., assignors to the United States of America as represented by the Secretary of the Air Force

Application September 14, 1956, Serial No. 610,036

4 Claims. (Cl. 250—27)

(Granted under Title 35, U.S. Code (1952), sec. 266)

The invention described herein may be manufactured and used by or for the United States Government for governmental purposes without payment to us of any royalty thereon.

The invention relates to a device for generating accurately spaced pulses for use in providing range or timing marks for radar or similar applications.

Another object is to provide a device, for generating range marks, which requires no calibration or adjustment during use.

Another object is to provide a device, for generating range marks, in which temperature change has very little effect on the range mark spacing.

Another object is to provide a device, for generating range marks, which will generate constant amplitude pulses for a full radar pulse interval and in which the range is not limited by attenuation in the delay line.

These above objects are accomplished by providing a device wherein the time spacing between the range marks is determined by the physical length of a solid delay line and wherein use is made of a gate circuit with a feedback circuit, of which the delay line is a part, connected between the output and input of said gate circuit.

Figure 1:
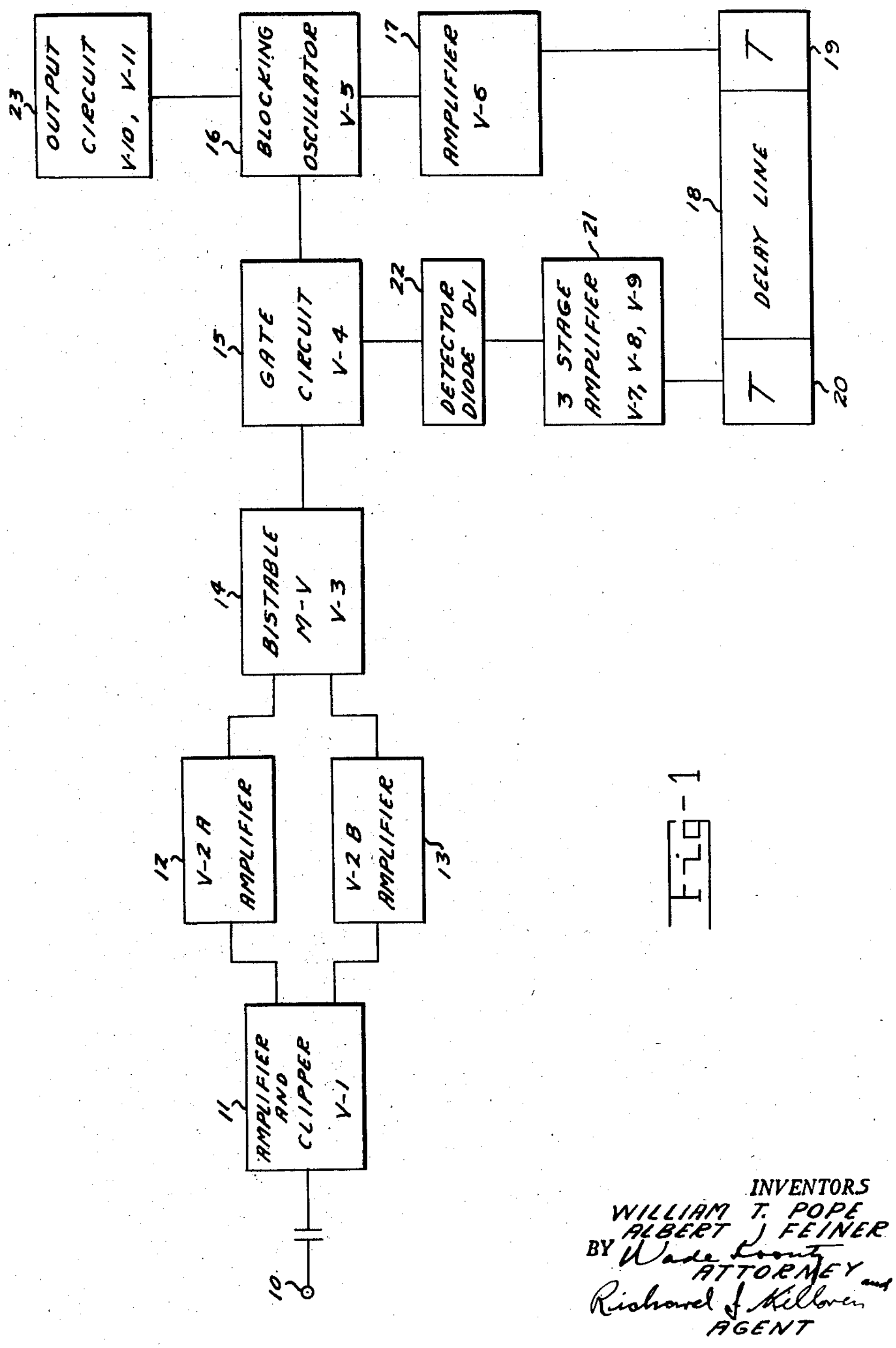
Fig. 1 is a block diagram of a range mark generator in accordance with the present invention.

Referring to Fig. 1 of the drawing, the reference numeral 10 refers to the terminal to which the radar pulses are applied. The pulses are amplified and clipped in an amplifier and clipper 11. The output of the amplifier and clipper circuit 11 is applied to a bistable multivibrator 14 through two amplifiers 12 and 13. The output pulse of the multivibrator is applied to a gate circuit 15, whereby the normally closed gate is opened.

Figure 2:
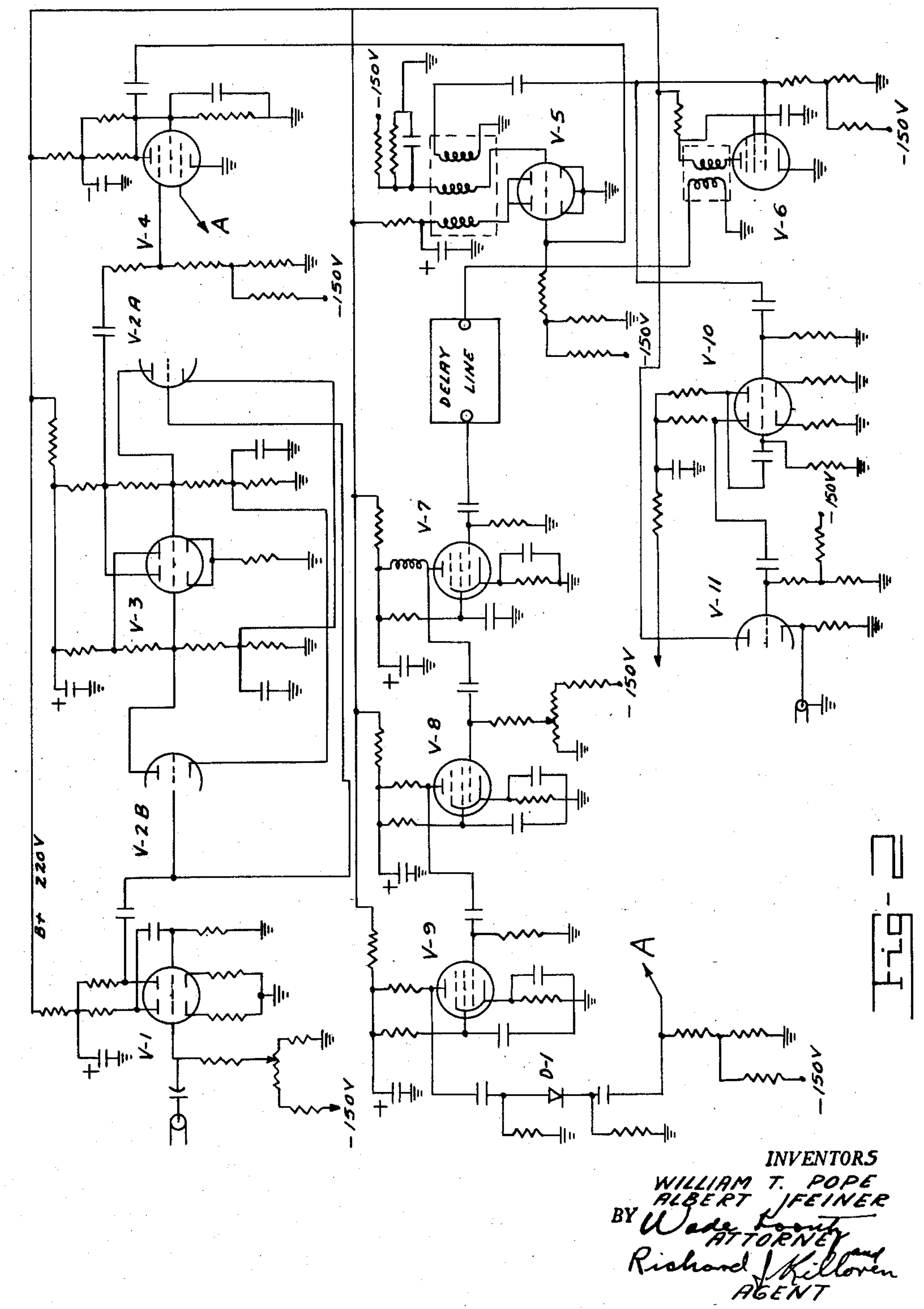
Fig. 2 is a circuit schematic of the device shown in block form in Fig. 1.

As can be seen from Fig. 2 the bistable multivibrator has an output pulse only during alternate radar pulse intervals. The gate is therefore open only during alternate intervals.

A blocking oscillator 16 is connected in the output circuit of the gate and is triggered by the leading edge of the pulse from the gate circuit. A sharp narrow pulse is produced by the blocking oscillator and is amplified in an amplifier 17 and fed to a solid acoustic, fused quartz delay line 18 which has piezo electric quartz transducers 19 and 20 at the input and output ends respectively.

The piezo electric transducer at the input end has a center frequency at about 15 mc. and converts the electrical energy from amplifier 17 to ultrasonic energy. The center frequency is not critical but is affected by the minimum pulse width of the range marks desired. The higher the center frequency the greater the absolute band width available. The output of the amplifier contains sufficient frequency components within the band widths of the delay line transducer but in cases where more enhancement of the delay line transducer frequency band components is required, the blocking oscillator pulse may be used to ring an oscillator at this frequency which can be amplified in IF type amplifiers. The piezo-electric quartz transducer at the output of the delay line has the same center frequency as the input transducer and converts the ultrasonic energy back to electrical energy.

The output of the second transducer is amplified in amplifiers $V_7$, $V_8$ and $V_9$ of the 3 stage amplifier 21 and detected by a crystal diode detector 22 to recover the video pulse. This pulse is amplified in gate tube $V_4$, which is still being held open by the output pulse from the multivibrator, and therefore triggers the blocking oscillator. This recirculation continues as long as the gate is held open.

The spacing between the range mark pulses is determined by the physical length of the delay line. To produce pulses of ten nautical mile intervals the model described herein uses a 124 microsecond fused quartz delay line. It is obvious that fused silica or other stable low temperature coefficient delay medium could be used. In practice a very small amount of delay, in the order of one microsecond or less occurs due to the associated circuits. For this reason the physical length of the solid line may be made slightly shorter than required for the pulse spacing required.

Because of the uncertainty of the quiescent state of the bistable multivibrator, the start of operation begins with either the first or second radar pulse. This is in no way detrimental to the use of the circuit for a range mark generator. However, if this is objectionable in certain applications, means of generating a half frequency switching wave with a definite starting polarity with the first trigger pulse is well known to the art and may be provided.

An output circuit 23 with an amplifier $V_{10}$ and a cathode follower $V_{11}$ therein, is provided in the output circuit of the blocking oscillator.

There is thus provided a device for generating accurately spaced pulses having constant amplitude for a full radar pulse interval which requires no calibration or adjustment during use and upon which temperature change has very little effect.

Although the invention has been described with reference to one particular embodiment it is to be understood that numerous changes may be made without departing from the general scope thereof, since numerous equivalents for various elements will suggest themselves to those skilled in the art.

What is claimed is:

1. A device for generating range marks for radar comprising; a bistable multivibrator, means for applying radar pulses to said multivibrator, a gate circuit connected to the output of said multivibrator, a blocking oscillator connected to the output of said gate circuit, a feedback circuit connected between the output circuit of said blocking oscillator and the input of said gate circuit to provide pulses to retrigger said blocking oscillator, a solid delay line in said feedback circuit for determining the time spacing between said range marks, a piezo-electric transducer connected to the input of said delay line to convert the electrical pulses to ultrasonic energy and a second piezo-electric transducer connected to the output of said delay line to convert the ultrasonic energy back to electrical pulse energy.

2. A device for generating range marks for radar comprising: a gate circuit, means responsive to radar pulses for operating said gate circuit during alternate radar pulse intervals, a blocking oscillator connected to the output of said gate circuit, a feedback circuit connected between the output circuit of said blocking oscillator and the input of said gate circuit to provide pulses to retrigger said blocking oscillator, a solid delay line in said feedback circuit for determining the time spacing between said range marks, a piezo-electric transducer connected to the input of said delay line to convert the electrical pulses to ultrasonic energy and a second piezo-electric transducer connected to the output of said delay line to convert the ultrasonic energy back to electrical pulse energy.

3. A device for generating range marks for radar comprising: a gate circuit, means responsive to radar pulses for operating said gate circuit during alternate radar pulse intervals, a blocking oscillator connected to the output of said gate circuit, a feedback circuit connected between the output of said blocking oscillator and the input of said gate circuit to provide pulses to retrigger said blocking oscillator, a solid delay line consisting of a low temperature coefficient delay medium in said feedback circuit for determining the time spacing between said range marks, a piezo-electric transducer connected to the input of said delay line to convert the electrical pulses to ultrasonic energy and a second piezo-electric transducer connected to the output of said delay line to convert the ultrasonic energy back to electrical pulse energy.

4. A device for generating range marks for radar comprising: a bistable multivibrator, means for applying radar pulses to said multivibrator, a gate circuit connected to the output of said multivibator, a blocking oscillator connected to the output of said gate circuit, a feedback circuit connected between the output circuit of said blocking oscillator and the input of said gate circuit to provide pulses to retrigger said blocking oscillator, a fused silica delay line in said feedback circuit for determining the time spacing between said range marks, a piezo-electric transducer connected to the input of said fused silica delay line to convert the electrical pulses to ultrasonic energy and a second piezo-electric transducer connected to the output of said fused silica delay line to convert the ultrasonic energy back to electrical pulse energy.

References Cited in the file of this patent

UNITED STATES PATENTS

| | | |
|---|---|---|
| 2,482,974 | Gordon | Sept. 27, 1949 |
| 2,510,054 | Alexander et al. | June 6, 1950 |
| 2,564,000 | Gaffney et al. | Aug. 14, 1951 |
| 2,590,405 | Hansell | Mar. 25, 1952 |
| 2,601,289 | Hollabaugh | June 24, 1952 |
| 2,697,166 | MacNichol et al. | Dec. 14, 1954 |
| 2,698,401 | Korelich | Dec. 28, 1954 |
| 2,750,499 | Newman et al. | June 12, 1956 |
| 2,795,698 | Cutler | June 11, 1957 |